(12) United States Patent
Jung et al.

(10) Patent No.: US 12,410,055 B2
(45) Date of Patent: Sep. 9, 2025

(54) METHOD FOR WATER-REPELLENT TREATMENT OF BORON NITRIDE POWDER AND WATER-REPELLENT-TREATED BORON NITRIDE

(71) Applicant: KOREA INSTITURE OF FUSION ENERGY, Daejeon (KR)

(72) Inventors: Yong Ho Jung, Seongnam-si (KR); Seung Ryul Yoo, Seo-gu Daejeon (KR); Dong Chan Seok, Gunsan-si (KR)

(73) Assignee: KOREA INSTITUTE OF FUSION ENERGY, Daejeon (KR)

( * ) Notice: Subject to any disclaimer, the term of this patent is extended or adjusted under 35 U.S.C. 154(b) by 412 days.

(21) Appl. No.: 17/421,971

(22) PCT Filed: Feb. 11, 2020

(86) PCT No.: PCT/KR2020/001867
§ 371 (c)(1),
(2) Date: Jul. 9, 2021

(87) PCT Pub. No.: WO2020/166921
PCT Pub. Date: Aug. 20, 2020

(65) Prior Publication Data
US 2022/0112084 A1    Apr. 14, 2022

(30) Foreign Application Priority Data
Feb. 11, 2019  (KR) .................. 10-2019-0015706

(51) Int. Cl.
*C04B 35/00* (2006.01)
*C01B 21/064* (2006.01)
(Continued)

(52) U.S. Cl.
CPC ........ *C01B 21/0648* (2013.01); *C04B 35/583* (2013.01); *C04B 35/62802* (2013.01);
(Continued)

(58) Field of Classification Search
CPC .............. C01B 21/0648; C04B 35/583; C04B 35/62802; C04B 35/62884; H05H 1/2406; H05H 2245/40
See application file for complete search history.

(56) References Cited

U.S. PATENT DOCUMENTS

2002/0051889 A1* 5/2002 Kanamori ................ C08J 7/046
                                                                        428/447
2007/0224530 A1* 9/2007 Kobori ................ G03G 5/0525
                                                                        430/123.51
(Continued)

FOREIGN PATENT DOCUMENTS

| JP | S63165461 A * | 7/1988 |
| JP | 2004161747 | 6/2004 |

(Continued)

OTHER PUBLICATIONS

KR-101499917-B1 English translation. (Year: 2023).*
(Continued)

*Primary Examiner* — Hai Y Zhang
(74) *Attorney, Agent, or Firm* — NORTON ROSE FULBRIGHT US LLP

(57) ABSTRACT

A method for water-repellent coating treatment of a boron nitride powders and water-repellent treated boron nitride are disclosed. The method includes producing a water-repellent coating layer on the surface of the boron nitride powders by plasma treatment using a silicon-containing organic compound containing silicone, wherein the water-repellent coat-
(Continued)

ing layer remains on the boron nitride through chemical binding with the boron nitride even after ultrasonic water washing.

8 Claims, 7 Drawing Sheets

(51) Int. Cl.
- *C04B 35/583* (2006.01)
- *C04B 35/628* (2006.01)
- *H05H 1/24* (2006.01)

(52) U.S. Cl.
CPC ..... *C04B 35/62884* (2013.01); *H05H 1/2406* (2013.01); *C01P 2004/04* (2013.01); *H05H 2245/40* (2021.05)

(56) References Cited

U.S. PATENT DOCUMENTS

2016/0326048 A1* 11/2016 Moon ................ B81C 1/00031
2017/0066890 A1* 3/2017 Oser ....................... C23C 16/00

FOREIGN PATENT DOCUMENTS

| KR | 100978846 | 10/2010 | |
|---|---|---|---|
| KR | 101294784 | 8/2013 | |
| KR | 101499917 | 3/2015 | |
| KR | 101499917 B1 * | 3/2015 | ............... C23C 4/06 |
| KR | 101529528 | 6/2015 | |

OTHER PUBLICATIONS

KR-101499917-B1 English translation. (Year: 2013).*
JP-S63165461-A English translation. (Year: 1988).*
KR-101499917-B1 English translation. (Year: 2015).*
International Search Report and Written Opinion issued in Corresponding PCT Application No. PCT/KR2020/001867, dated Jun. 16, 2020 (English Translation provided).

* cited by examiner (a) (b)

(a) (b)

(a)  (b)

METHOD FOR WATER-REPELLENT TREATMENT OF BORON NITRIDE POWDER AND WATER-REPELLENT-TREATED BORON NITRIDE

CROSS REFERENCE TO RELATED APPLICATIONS

This application is a national phase under 35 U.S.C. § 371 of International Application No. PCT/KR2020/001867, filed Feb. 11, 2020, which claims the benefit of priority to Korean Patent Application Serial No. 10-2019-0015706, filed Feb. 11, 2019, the entire contents of each of which are hereby incorporated by reference in their entirety.

FIELD OF THE INVENTION

The present disclosure relates to a method for water-repellent treatment of boron nitride powders, and water-repellent coating treated boron nitride. More specifically, the present disclosure relates to a method for water-repellent treatment of boron nitride powders, in which an organic compound containing silicon as a precursor is vaporized to produce an atmosphere, and then boron nitride powders are subjected plasma-treatment under the atmosphere, thereby forming a water-repellent coating layer on a surface of the boron nitride powders, and the water-repellent coating layer remains on the boron nitride powders even after ultrasonic water washing, thereby achieving continuous water-repellency ability.

DESCRIPTION OF RELATED ART

In order to improve properties of a product currently used, a functional layer such as a water-repellent layer is coated on a surface of a material of the product. Coating the functional layer on the surface of the material is a particularly important factor in practical applications. Recently, studies to improve durability and safety of the product by coating a hydrophobic or water-repellent layer on surfaces of powders particles of the product are being actively conducted.

Techniques that may be used for coating the hydrophobic or water-repellent layer the surface of particles and are currently known may include chemical vapor deposition, sol-gel method, and plasma process. The plasma process may form hydrophobic and water-repellent layers on various materials while not changing the properties of the material itself. The plasma process may control a parameter such as a precursor material, such that properties such as the hydrophobicity and a thickness of the coating layer may be easily changed.

Hexamethyldisiloxane (HMDSO) which is widely used as a coating precursor material in a surface coating of particles may produce a functional group such as a silane group containing silicon to form a water-repellent coating layer. Further, the HMDSO does not generate harmful substances during the coating process and has exceptionally good thermal stability. Thus, HMDSO is currently widely used as a coating precursor material.

SUMMARY OF THE INVENTION

One purpose of the present disclosure is to provide a method for water-repellent treatment of boron nitride powders in which a water-repellent coating layer is formed on a surface of boron nitride powders via plasma treatment using an organic compound containing silicon as a precursor.

Another purpose of the present disclosure is to provide water-repellent coating treated boron nitride prepared by the method.

One aspect of the present disclosure provides a method for water-repellent treatment of boron nitride powders, the method including performing plasma treatment on the boron nitride powders.

In one implementation of the method, the method includes: placing the boron nitride powders in a plasma generated region; and exposing the boron nitride powders to plasma of the plasma generated region.

In one implementation of the method, the plasma includes plasma of a silicon-containing organic compound.

In one implementation of the method, the silicon-containing organic compound includes hexamethyldisiloxane, tetraethoxysilane (TEOS) or trimethylchlorosilane (TMCS).

In one implementation of the method, performing the plasma treatment includes forming a water-repellent coating layer on surfaces of the boron nitride powders.

In one implementation of the method, a thickness of the water-repellent coating layer is 40 nm or smaller.

In one implementation of the method, the water-repellent coating layer contains silicon, carbon and oxygen, wherein the water-repellent coating layer chemically bonds to the boron nitride.

In one implementation of the method, the water-repellent coating layer remains on the boron nitride after ultrasonic water washing is performed thereon.

In one implementation of the method, the water-repellent treated boron nitride powders are mixed into a non-polar solvent to form a colloid.

In one implementation of the method, the method further includes injecting a vaporized silicon-containing organic compound into the plasma generated region.

In one implementation of the method, the injection of the vaporized silicon-containing organic compound includes passing a solution of the silicon-containing organic compound through a bubbler, and injecting the vaporized silicon-containing organic compound and a carrier gas into the plasma generated region.

Another aspect of the present disclosure provides a water-repellent coating treated boron nitride produced by the above the method, wherein the water-repellent coating treated boron nitride includes boron nitride powders, and a water-repellent coating layer formed on the boron nitride powders, wherein the water-repellent coating layer is chemically bonded to the boron nitride.

In one implementation of the water-repellent coating treated boron nitride, a thickness of the water-repellent coating layer is 40 nm or smaller.

In one implementation of the water-repellent coating treated boron nitride, the water-repellent coating layer contains silicon, carbon and oxygen, wherein the water-repellent coating layer is chemically bonded to the boron nitride.

In one implementation of the water-repellent coating treated boron nitride, the water-repellent coating layer remains on the boron nitride after ultrasonic water washing is performed thereon.

In one implementation of the water-repellent coating treated boron nitride, the water-repellent treated boron nitride powders are mixed into a non-polar solvent to form a colloid.

According to the method for water-repellent treatment of boron nitride powders and the water-repellent coating treated boron nitride in accordance with the present disclosure, the plasma-treatment is carried out on the boron nitride powders under a gaseous silicon-containing organic compound atmosphere, such that the water-repellent coating layer is formed on the surface of boron nitride powders to impart water-repellent ability and hydrophobicity to the boron nitride powders. Further, since the thus formed water-repellent coating layer is chemically bonded to the boron nitride powders, the coating layer remains on the boron nitride even after ultrasonic water washing, such that the water-repellent coating treated boron nitride may continuously have water-repellent ability.

DETAILED DESCRIPTIONS

Figure 1:
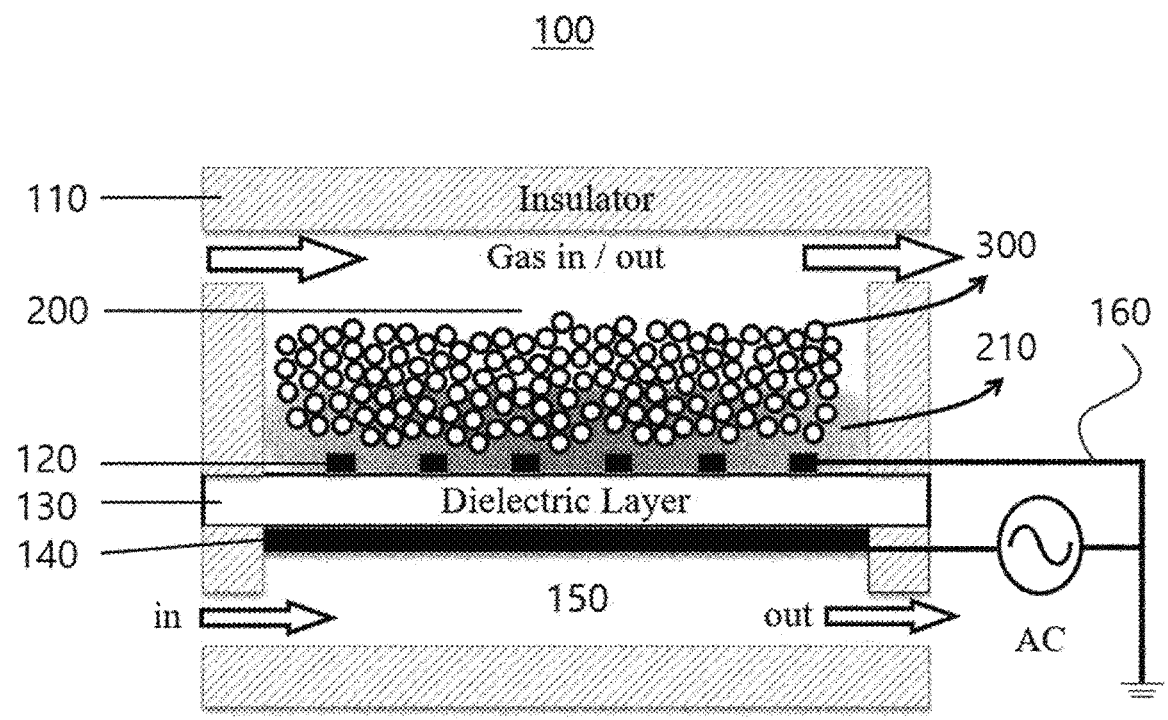
FIG. 1 is a schematic diagram illustrating a surface dielectric barrier discharge plasma apparatus used for water-repellent treatment of boron nitride powders according to one embodiment of the present disclosure.

Hereinafter, an embodiment of the present disclosure will be described in detail with reference to the accompanying drawings. The present disclosure may have various changes and modifications. Specific embodiments are illustrated in the drawings and are described in the Detailed descriptions. However, the embodiments are not intended to limit the present disclosure to specific forms. All changes, equivalents to, and substitutes may be included in the spirit and scope of the present disclosure. In describing the drawings, similar reference numerals are used for similar components.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic diagram illustrating a surface dielectric barrier discharge (hereinafter referred to as SDBD) plasma apparatus among plasma treatment apparatuses used for water-repellent treatment of boron nitride powders according to one embodiment of the present disclosure. As shown in FIG. 1, the SDBD plasma apparatus 100 that may be used in one embodiment of the present disclosure includes a treatment target 300 located in a plasma generated region 210; and a first inlet for injecting gas into the plasma generated region 210. The SDBD plasma apparatus 100 includes a chamber 110 made of an insulator and having an inner space 200 defined therein; a dielectric layer 130 and disposed in the inner space 200; a first electrode 140 placed on one face of the dielectric layer 130; a second electrode 120 placed on the opposite face of the dielectric layer, wherein the second electrode 120 includes a plurality of bars extending in one direction and spaced apart from each other; and a voltage applicator 160 connected to the first electrode 140 and the second electrode 120 to apply a voltage to the two electrodes. Additionally, the SDBD plasma apparatus may include a cooling fluid channel 150, and a second inlet through which the cooling fluid is injected into the cooling fluid channel; and a second outlet through which the injected cooling fluid exits.

Figure 2:
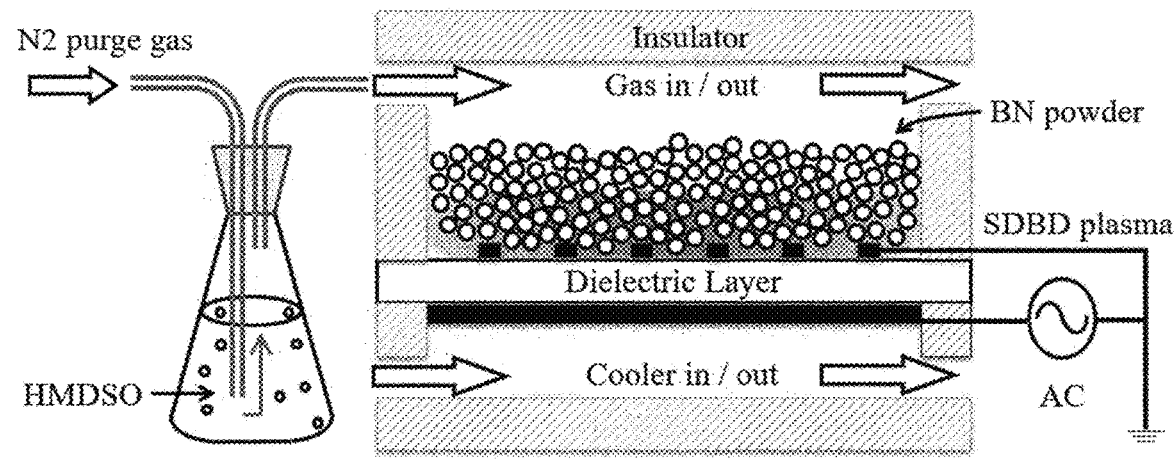
FIG. 2 is a diagram for illustrating a method for water-repellent treatment of boron nitride powders according to one embodiment of the present disclosure.

FIG. 2 is a diagram for illustrating a method for water-repellent treatment of boron nitride powders of the present disclosure.

Referring to FIG. 2, the method for water-repellent treatment of boron nitride powders in accordance with one embodiment of the present disclosure is described as follows.

The method for water-repellent treatment of boron nitride powders according to the present disclosure includes placing boron nitride powders as a treatment target into the plasma generated region and on a top face of the first electrode provided inside the plasma apparatus configured as described above.

In order to produce a silicon-containing organic compound plasma atmosphere inside the plasma apparatus, a vaporized silicon-containing organic compound is injected into the plasma generated region. The injection of the vaporized silicon-containing organic compound may be carried out by passing a solution of the silicon-containing organic compound through a bubbler and then injecting the compound gas as the process gas and a carrier gas into the plasma generated region through the first gas inlet. In this connection, the silicon-containing organic compound used may be a carbon compound containing silicon, such as hexamethyldisiloxane, tetraethoxysilane (TEOS) or trimethylchlorosilane (TMCS).

Then, when a voltage is applied to the first and second electrodes in the plasma apparatus, a silicon-containing organic compound plasma is generated around the second electrode. The generated silicon-containing organic compound plasma may be diffused into pores existing between the boron nitride powders present on the top face of the first electrode. The diffused silicon-containing organic compound plasma may produce a functional group containing silicon exhibiting hydrophobic properties on surfaces of the boron nitride powders. For example, the functional group containing the silicon may be a silane group.

The thus water-repellent coating treated boron nitride may be composed of the boron nitride particles and the water-repellent coating layer formed on the surfaces of the boron nitride particles. The water-repellent coating layer may contain silicon, carbon and oxygen, and may chemically bond to the boron nitride. Further, the water-repellent coating layer may have a thickness of 40 nm or greater.

The water-repellent coating treated boron nitride has strong water-repellent ability due to chemical bonding between boron nitride and the water-repellent coating layer. Thus, even after ultrasonic water washing, the water-repellent coating layer remains on the boron nitride without losing the water-repellent properties. When the water-repellent coating treated boron nitride powders are mixed with a non-polar solvent, the powders are not agglomerated but forms a colloid and disperses well.

Hereinafter, a method for water-repellent coating treatment of boron nitride powders and the water-repellent coating treated boron nitride according to the present example and the comparative examples of the present disclosure will be described in more detail.

Present Example 1: Preparation of Present boron nitride Powder Sample 1

A hexamethyldisiloxane (hereinafter referred to as HMDSO) silicon-containing organic compound was used as a process gas and a $N_2$ purge gas was used as a carrier gas. Using the plasma treatment apparatus configured as shown in FIG. 1, the plasma treatment was carried out based on the method for water-repellent treatment of boron nitride powders as described above. Thus, a present boron nitride powder sample 1 was obtained. The present boron nitride powder sample 1 was referred to as "HMDSO bubbling (N2) plasma—BN".

Comparative Example 1: Preparation of Comparative boron nitride Powder Sample 1

A comparative boron nitride powder sample 1 was obtained via substantially the same process as the preparation process of the water-repellent coating treated boron nitride powder sample 1 according to the present example 1, except that plasma treatment was not carried out. The comparative boron nitride powder sample 1 was referred to as "HMDSO bubbling ($N_2$)—BN".

Comparative Example 2: Preparation of Comparative boron nitride Powder Sample 2

A pure comparative boron nitride powder sample 2 which was not subjected to any treatment was prepared. The pure comparative boron nitride powder sample 2 was referred to as "Untreated BN".

Surface Analysis-1: Scanning Electron Microscopy Image

A scanning electron microscope image of each of the present example 1, the comparative example 1 and the comparative example 2 as prepared above was obtained under an acceleration voltage of 3 kV using a field emission scanning electron microscope (Gemini, Carl Zeiss Microscopy, Germany). The results are shown in FIG. 3 to FIG. 5.

Figure 3:
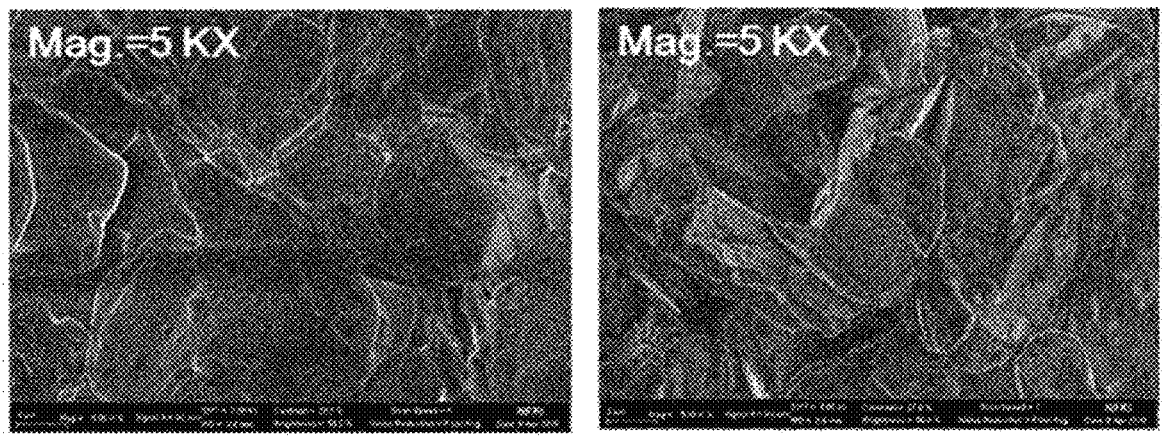
FIG. 3 is a view showing a scanning electron microscope image of a sample 1 prepared according to a present example 1 of the present disclosure.

FIG. 3 shows a scanning electron microscope image of the present boron nitride powder sample 1 according to the present example 1 of the present disclosure.

Referring to FIG. 3, it may be identified that a foreign matter is formed at a surface of the sample 1 obtained by performing HMDSO bubbling and plasma treatment on boron nitride powders.

Figure 4:
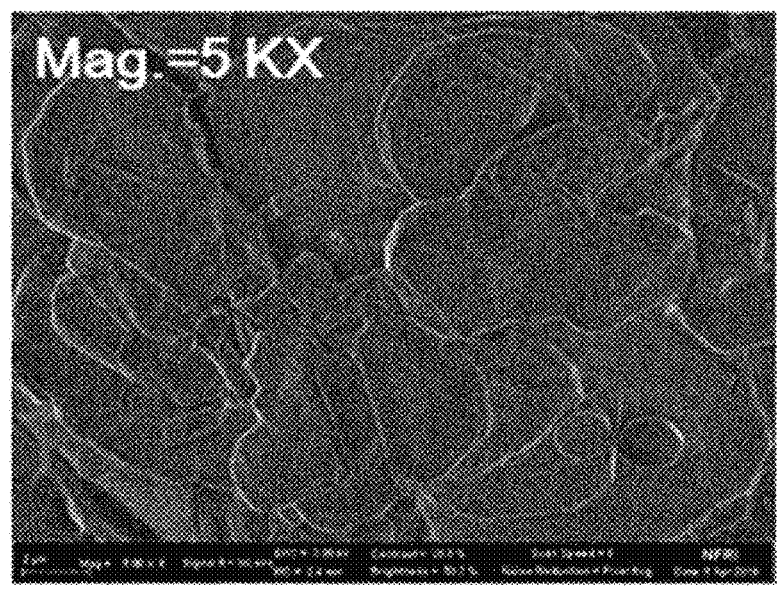
FIG. 4 and FIG. 5 are diagrams showing scanning electron microscope images of a comparative sample 1 and a comparative sample 2 prepared according to a comparative example 1 and a comparative example 2 of the present disclosure, respectively.
Figure 5:
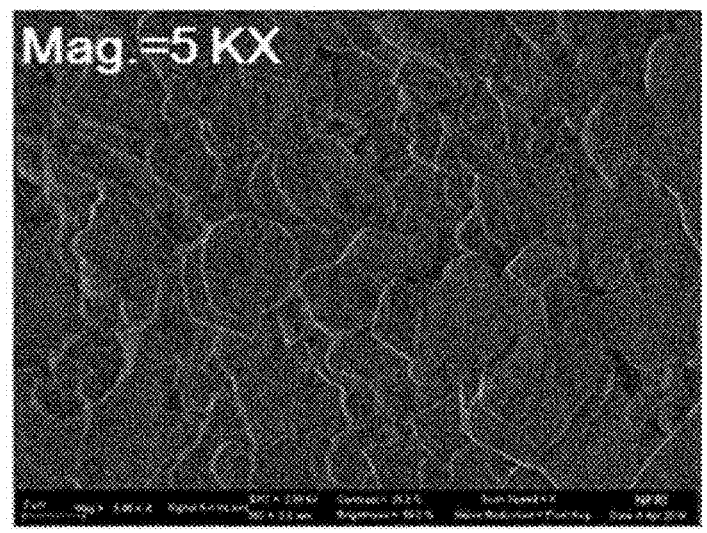

FIG. 4 and FIG. 5 show scanning electron microscope images of the comparative boron nitride powder sample 1 and the comparative boron nitride powder sample 2 as prepared according to the comparative example 1 and the comparative example 2 of the present disclosure, respectively.

Figure 6:
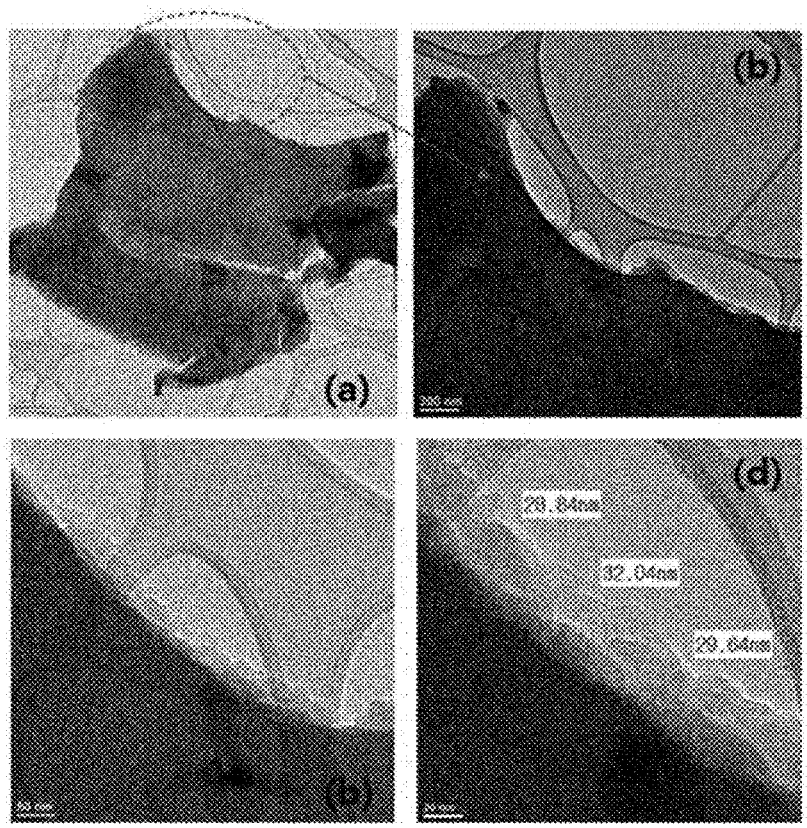
FIG. 6 is a view showing a field emission transmission electron microscope image of the sample 1 prepared according to the present example 1 of the present disclosure.

Referring to FIG. 4 and FIG. 5, compared with FIG. 6, it may be seen that a surface of the comparative boron nitride powder sample 1 subjected only to HMDSO bubbling using $N_2$ gas and a surface of the pure comparative boron nitride powder sample 2 are relatively clean.

Surface Analysis-2: Field Emission Transmission Electron Microscopy Image

A field emission transmission electron microscope image of each of the present example 1, the comparative example 1 and the comparative example 2 as prepared above was obtained under 200 kV accelerating voltage using a cold FEG field emission transmission electron microscope (JEM-ARM200, JEOL USA, Inc. the United States). The results are shown in FIG. 6 to FIG. 8.

FIG. 6 is a view showing a field emission transmission electron microscope image of the present boron nitride powder sample 1 according to the present example 1 of the present disclosure. (a), (b), (c), and (d) in FIG. 6 show magnified surface images having a magnification increasing in this order.

Referring to FIG. 6, it may be seen that a new layer having a thickness of 40 nm or smaller is formed at a surface of the present boron nitride powder sample 1 obtained by performing the HMDSO bubbling and plasma treatment on boron nitride powders.

Figure 7:
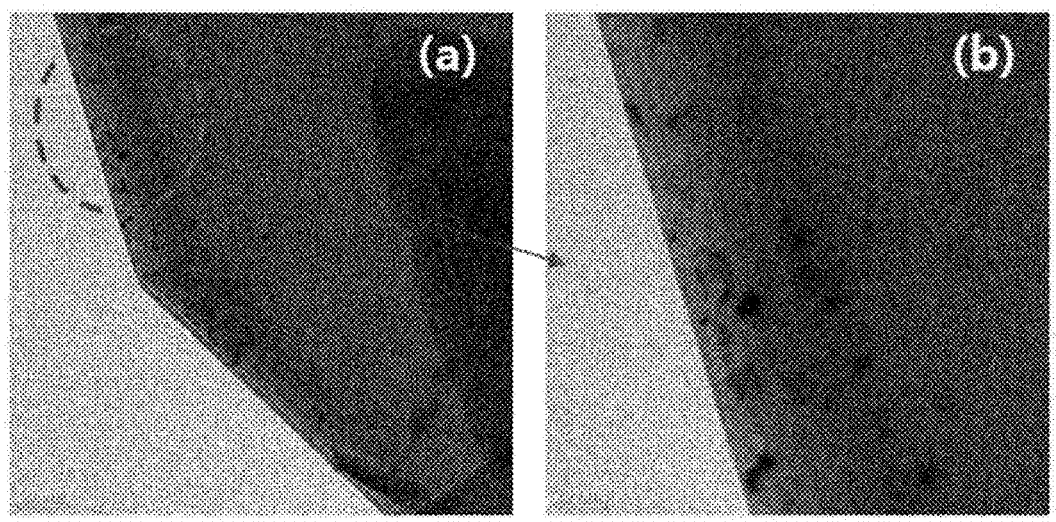
FIG. 7 and FIG. 8 are diagrams showing field emission transmission electron microscope images of the comparative sample 1 and the comparative sample 2, respectively, prepared according to the comparative example 1 and the comparative example 2 of the present disclosure.
Figure 8:
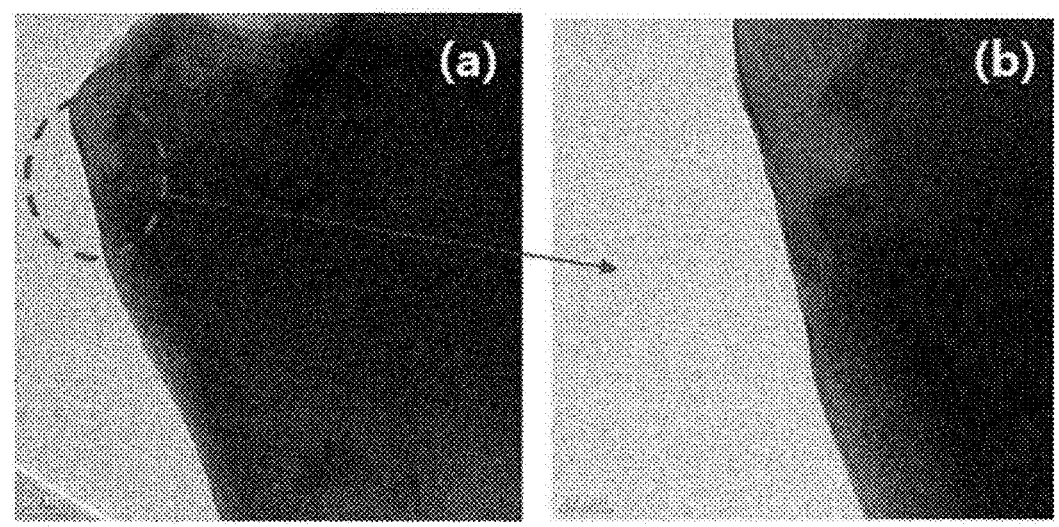

FIG. 7 and FIG. 8 show field emission transmission electron microscope images of the comparative boron nitride powder sample 1 and the comparative boron nitride powder sample 2 prepared according to the comparative example 1 and the comparative example 2, respectively.

Referring to FIG. 7 and FIG. 8, compared with FIG. 6, it may be identified that a new layer is not formed at a surface of the comparative boron nitride powder sample 1 subjected only to HMDSO bubbling using $N_2$ gas and a surface of the pure comparative boron nitride powder sample 2.

Surface Analysis-3: EDAX Mapping Image

Figure 9:
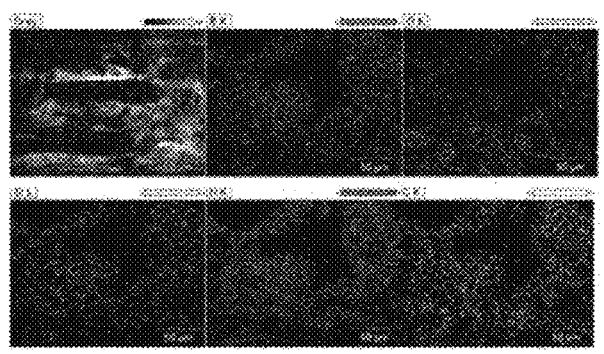
FIG. 9 is a diagram showing an EDAX mapping image of the sample 1 prepared according to the present example 1 of the present disclosure.
Figure 9:
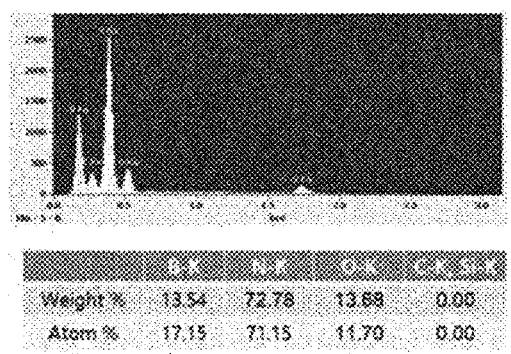
Figure 10:
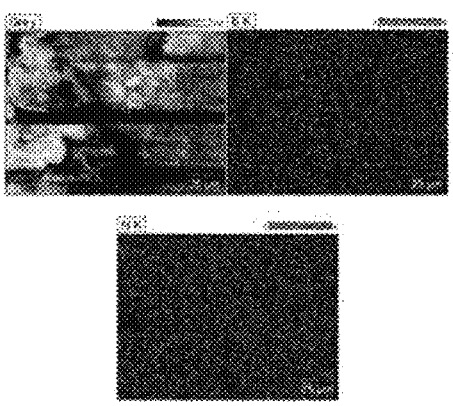
FIG. 10 and FIG. 11 are diagrams showing EDAX mapping images of the comparative sample 1 and the comparative sample 2, respectively, prepared according to the comparative example 1 and the comparative example 2 of the present disclosure.
Figure 10:
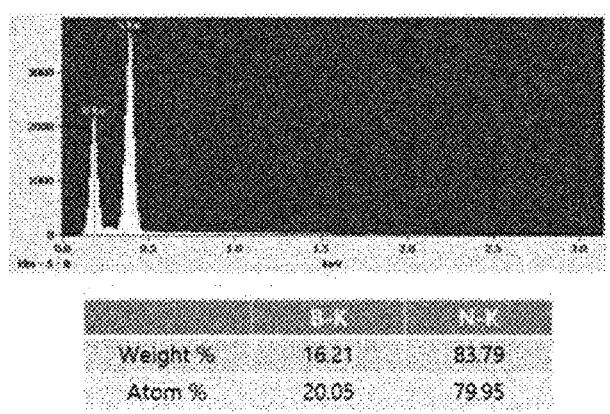
Figure 11:
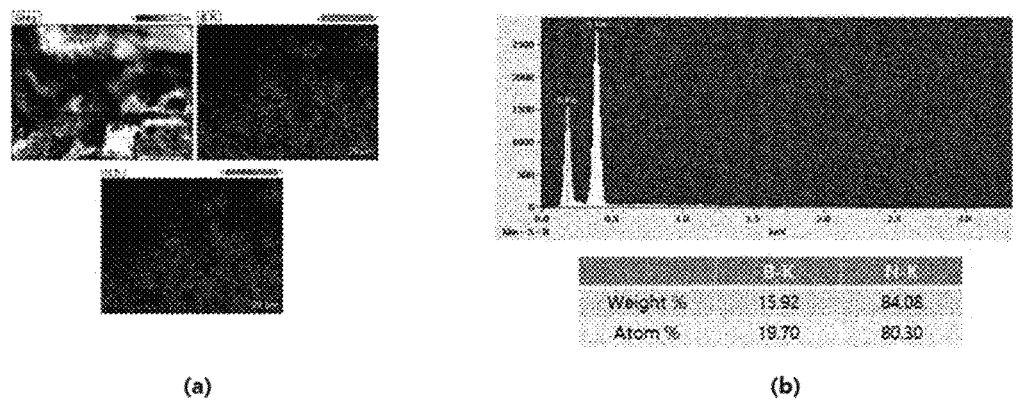

An EDAX mapping image of each of the present example 1, the comparative example 1 and the comparative example 2 as prepared above was obtained under an acceleration voltage of 3 kV using a field emission scanning electron microscope (Gemini, Carl Zeiss Microscopy, Germany) The results are shown in FIG. 9 to FIG. 11.

FIG. 9 shows the EDAX mapping image of the present sample 1 according to the present example 1 of the present disclosure.

Referring to FIG. 9, it may be identified that elements present at the surface of the sample 1 obtained by performing HMDSO bubbling and plasma treatment on boron nitride powders include silicon (Si), carbon (C) and oxygen (O) in addition to boron (B) and nitrogen (N). Silicon (Si) may be considered to be due to the use of hexamethyldisiloxane (HMDSO) as a liquid silicon precursor. Further, due to the presence of carbon (C) and oxygen (O), the boron nitride powders may be chemically bonded to the layer formed on the surface thereof. Based on the results shown in FIG. 3 and FIG. 6, it may be seen that the layer formed at the surface of the present boron nitride powder sample 1 subjected to the HMDSO bubbling and the plasma treatment is a water-repellent coating layer. It may be seen that the present sample 1 has water-repellency ability due to the silicon (Si) present in the water-repellent coating layer.

FIG. 10 and FIG. 11 show boron nitride powders EDAX mapping images of the comparative boron nitride powder sample 1 and the comparative boron nitride powder sample 2 as prepared according to the comparative example 1 and the comparative example 2, respectively.

Referring to FIG. 10 and FIG. 11, compared with FIG. 9, it may be identified that only boron (B) and nitrogen (N) are present at a surface of the comparative boron nitride powder sample 1 subjected only to HMDSO bubbling using $N_2$ gas and a surface of the pure comparative boron nitride powder sample 2.

Thus, it may be seen that a water-repellent coating layer is not formed on the surface of the boron nitride powders of each of the comparative sample 1 and the comparative sample 2.

In particular, referring to the results of the comparative sample 1 compared to the present sample 1, it may be seen that only the HMDSO bubbling using $N_2$ gas cannot form a water-repellent coating layer on the surface of the boron nitride powder.

Surface Analysis-4: XPS

An XPS spectrum of each of the present example 1, the comparative example 1 and the comparative example 2 as prepared above was measured under a voltage of 13 kV, using X-ray Photoelectron Spectroscopy (ESCA2000, VG microtech, UK), and using twin anodes Al $K_a$ (1,486.6 eV) and Mg $K_a$ (1,253.6 eV) as an X-ray generation source material. The results are shown in FIG. 12.

Figure 12:
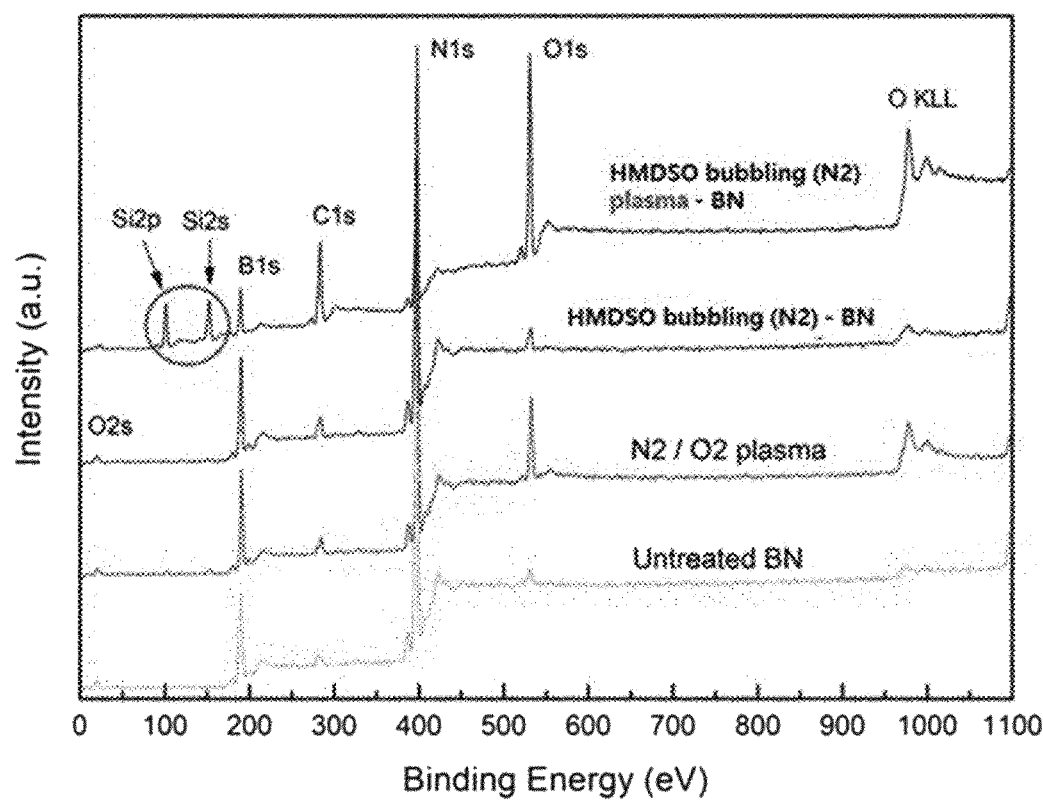
FIG. 12 is a view showing an XPS spectrum of each of samples prepared according to the present example 1, the comparative example 1 and the comparative example 2 of the present disclosure.

Referring to FIG. 12, it may be identified that the MDSO bubbling ($N_2$) plasma—BN as the present sample 1 according to the present example 1 has Si binding energy based on peaks of Si 2p and Si 2s. Thus, it may be seen that the boron nitride powders are chemically bonded to the water-repellent coating layer formed on the surface thereof.

On the contrary, it may be identified that in the comparative sample 1 and the comparative sample 2 according to the comparative example 1 and the comparative example 2, respectively, only peaks of B1s and N1s are prominent, but the peaks of Si 2p and Si 2s are not present, and thus the Si bond is absent.

Dispersion Evaluation

A dispersion evaluation was performed on the present example 1 and the comparative example 2 as prepared above by respectively adding the present boron nitride powder sample 1 and the comparative boron nitride powders sample 2 to n-hexane solution as a non-polar solvent. The result is shown in FIG. 13.

Figure 13:
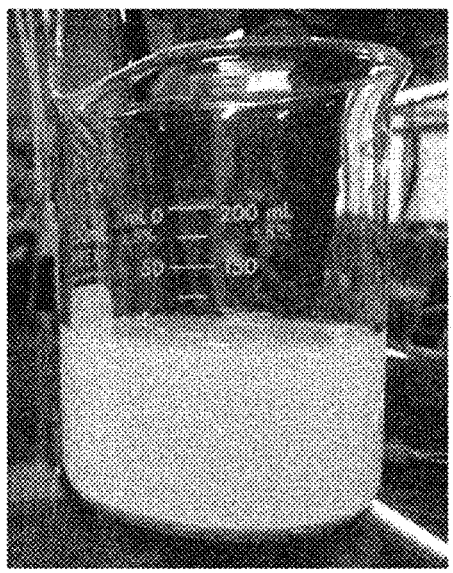
FIG. 13 is an image showing a dispersion evaluation result of each of the samples prepared according to the present example 1 and the comparative example 2 of the present disclosure.
Figure 13:
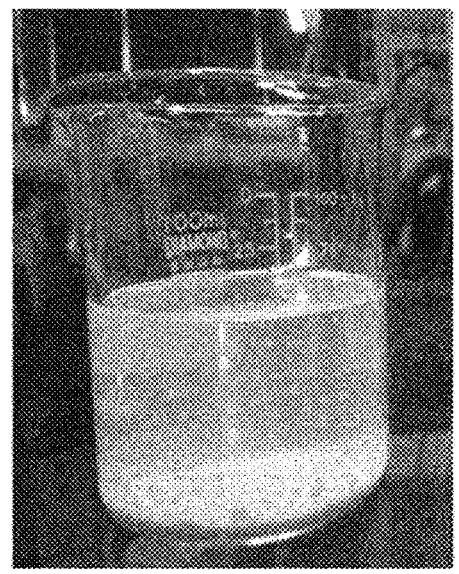

Referring to FIG. 13, (a) in FIG. 13 showing the dispersion of the present boron nitride powder sample 1 according to the present example 1 may identify a colloidal state in which powders of the present boron nitride powder sample 1 are not agglomerated with each other. Unlike (a) in FIG. 13, (b) in FIG. 13 showing the dispersion of the comparative boron nitride powders sample 2 may identify that powders of the comparative boron nitride powder sample 2 are aggregated with each other and are precipitated in a larger grain state.

Thus, it may be identified that the water-repellent coating layer formed on the surface of the boron nitride powders of the present sample 1 obtained by performing the HMDSO bubbling and the plasma treatment on boron nitride powders according to the present example 1 has the water-repellency ability.

The present disclosure has been described with reference to the preferred embodiment of the present disclosure. Those skilled in the art will understand that various modifications and changes may be made to the present disclosure without departing from the spirit and scope of the present disclosure set forth in the following claims.

REFERENCE NUMERALS

100: surface dielectric barrier discharge plasma apparatus
110: chamber
120: second electrode
130: dielectric layer
140: first electrode
150: cooling fluid channel
160: voltage applicator
200: inner space
210: plasma generated region
300: treatment target

What is claimed is:
1. A method for water-repellent treatment of boron nitride powders, the method comprising the steps of:
   performing plasma treatment on the boron nitride powders by injecting a vaporized silicon-containing organic compound into a plasma generated region using a dielectric barrier discharge plasma apparatus;
   wherein the injection of the vaporized silicon-containing organic compound includes passing a solution of the silicon-containing organic compound through a bubbler, and injecting the vaporized silicon-containing organic compound and a carrier gas into the plasma generated region;
   wherein the plasma includes plasma formed from the silicon-containing organic compound;

wherein performing the plasma treatment includes forming a water-repellent coating layer on surfaces of the boron nitride powders;

wherein the silicon-containing organic compound includes hexamethyldisiloxane, tetraethoxysilane (TEOS) or trimethylchlorosilane (TMCS);

wherein the water-repellent coating layer contains silicon, carbon and oxygen; and wherein the water-repellent coating layer chemically bonds to the boron nitride.

2. The method of claim 1, wherein the method includes:

placing the boron nitride powders in a plasma generated region; and exposing the boron nitride powders to plasma of the plasma generated region.

3. The method of claim 1, wherein the plasma includes plasma of hexamethyldisiloxane.

4. The method of claim 1, wherein the silicon-containing organic compound includes trimethylchlorosilane (TMCS).

5. The method of claim 4, wherein a thickness of the water-repellent coating layer is 40 nm or smaller.

6. The method of claim 4, wherein the water-repellent coating layer remains on the boron nitride after ultrasonic water washing is performed thereon.

7. The method of claim 4, wherein the water-repellent treated boron nitride powders are mixed into a non-polar solvent to form a colloid.

8. The method of claim 1, wherein the plasma includes plasma of tetraethoxysilane.

* * * * *

UNITED STATES PATENT AND TRADEMARK OFFICE
CERTIFICATE OF CORRECTION

Page 1 of 1

| | |
|---|---|
| PATENT NO. | : 12,410,055 B2 |
| APPLICATION NO. | : 17/421971 |
| DATED | : September 9, 2025 |
| INVENTOR(S) | : Yong Ho Jung, Seung Ryul Yoo and Dong Chan Seok |

It is certified that error appears in the above-identified patent and that said Letters Patent is hereby corrected as shown below:

On the Title Page

Item (71) Delete "KOREA INSTITURE OF FUSION ENERGY" and replace with --KOREA INSTITUTE OF FUSION ENERGY--.

Signed and Sealed this
Twenty-first Day of October, 2025

John A. Squires
*Director of the United States Patent and Trademark Office*